United States Patent [19]
Richeson, Jr.

[11] 3,831,077
[45] Aug. 20, 1974

[54] REGULATED, CONTROLLED-RECTIFIER POWER SUPPLY

[75] Inventor: William E. Richeson, Jr., Fort Wayne, Ind.

[73] Assignee: Minnesota Mining and Manufacturing Company, St. Paul, Minn.

[22] Filed: Jan. 2, 1973

[21] Appl. No.: 320,536

[52] U.S. Cl............................ 321/2, 321/11, 321/18
[51] Int. Cl. .......................................... H02m 3/32
[58] Field of Search ............... 321/18, 47, 16; 317/2

[56] References Cited
UNITED STATES PATENTS

| | | | |
|---|---|---|---|
| 3,412,314 | 11/1968 | Crane | 321/16 |
| 3,517,301 | 6/1970 | Huber | 321/18 X |
| 3,551,745 | 12/1970 | Nicholas | 317/16 |
| 3,564,388 | 2/1971 | Nolf | 321/18 |
| 3,569,784 | 3/1971 | Carroll | 317/16 |
| 3,577,060 | 5/1971 | Richeson, Jr. | 321/11 |
| 3,597,675 | 8/1971 | Peek et al. | 321/18 X |

*Primary Examiner*—William M. Shoop, Jr.
*Attorney, Agent, or Firm*—Alexander, Sell, Steldt & Delahunt

[57] ABSTRACT

A regulated and protected power supply in which the amount of energy delivered to a load from an A.C. source is controlled by varying the timing of the "firing-angle" when conduction is initiated through a controlled-rectifier. The zero-crossings of the A.C. supply voltage are sensed to time an isolated source of an accurately defined sawtooth waveshape. This sawtooth signal is mixed with an error signal indicating load voltage fluctuations and the result signal is applied to a threshold circuit which supplies firing impulses to the gate electrode of a silicon controlled-rectifier (SCR). The SCR is interconnected with the combination of a smoothing inductor, a filter capacitor, and a catching diode in a switching regulator configuration and supplies regulated D.C. power to a transistor bridge which is switched by a precision frequency driving signal to supply power to a load circuit. An SCR crowbar circuit, activated by either overvoltage or overcurrent conditions at the output of the switching regulator, protects the bridge and load circuit against damage by first placing a low-impedance across the switching regulator output, and then initiating a power supply shut-down sequence which protects the supply and the load against damage.

8 Claims, 3 Drawing Figures

REGULATED, CONTROLLED-RECTIFIER POWER SUPPLY

BACKGROUND OF THE INVENTION

This invention relates to electrical power supply systems and, more particularly, to the regulation and protection of power supplies employing solid-state switching elements.

The power supply disclosed in this specification is the successor to, and represents an improvement over, two prior power supply arrangements described in U.S. Pat. No. 3,412,314 which issued to Paul J. Crane on Nov. 19, 1968, and in U.S. Pat. No. 3,577,060 which issued to William E. Richeson, Jr. on May 4, 1971.

It is an object of the present invention to improve the performance and reliability of electrical power supplies of the type employing semiconductor devices as power switching elements, while protecting such supplies against the internal damage which might otherwise result from overvoltage or overcurrent conditions caused by supply voltage fluctuations, noise impulses, or load circuit anomalies.

SUMMARY OF THE INVENTION

In accordance with a first feature of the present invention, a control circuit, isolated from electrical noise and level fluctuations in the power circuits, is employed to generate a sawtooth signal of accurate waveshape which is mixed with a filtered error signal indicative of load voltage fluctuations to produce a result signal which is employed to actuate a threshold device which in turn provides accurately timed "firing pulses" for controlling the flow of energy through a controlled-rectifier to the load circuit.

The sawtooth generator is synchronized to the zero-crossings of the A.C. line voltage but is substantially unresponsive to level fluctuations and noise on the power circuits. Similarly, the means for deriving an error signal indicative of load voltage changes is also filtered to prevent noise impulses on the line or load circuits from affecting the timing of the firing pulses.

In accordance with a further feature of the present invention, a "crowbar" circuit is connected across the output filter capacitor in the regulated D. C. supply and arranged to be triggered into conduction by either overcurrent or overvoltage conditions, thus discharging the filter capacitor in order to prevent damage to the connected circuitry. The initiation of conduction through this crowbar circuit also actuates a latching circuit which generates a continuous inhibit signal which blocks further power flow until the latching circuit is affirmatively "unlatched."

During "turn ON", additional switching means are employed preventing the initiation of conduction through the regulated D.C. supply until other operating potentials needed are present. To remove power from the load circuit during "turn OFF" conduction through the regulated D.C. supply is first terminated; thereafter, a source of a direct current voltage derived from the voltage delivered to the load insures that the adequate operating potentials are available during "run down."

These and other objects, features and advantages of the present invention will be more clearly understood following a consideration of the following detailed description which is presented in conjunction with the attached drawings.

DESCRIPTION OF THE PREFERRED EMBODIMENT

In the description which follows, the general organization and operation of the power supply system will be discussed first, followed by a discussion of the details of the supply.

Figure 1A:
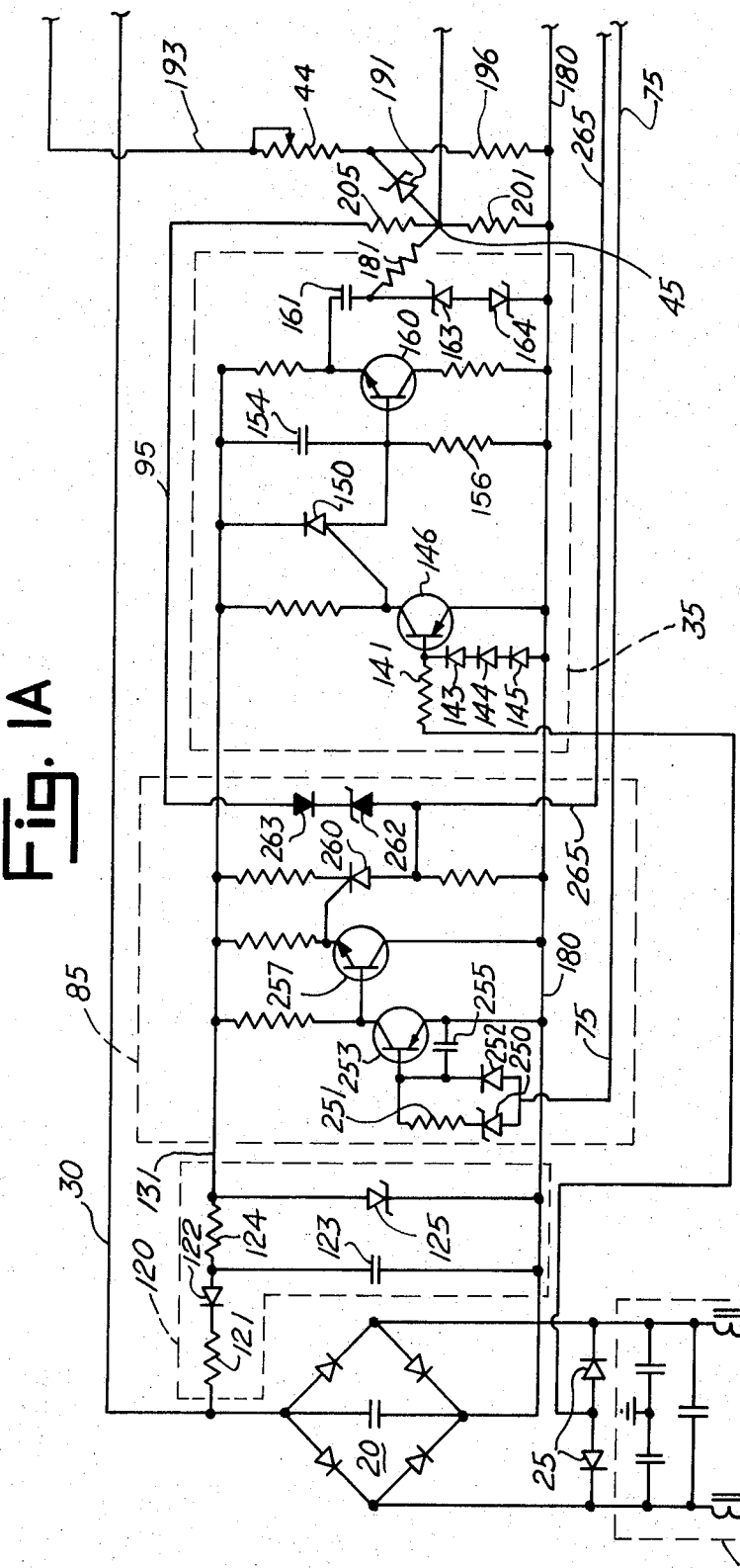
FIG. 1A and 1B taken together form a schematic diagram of a power supply arrangement incorporating the features of the present invention.
Figure 1B:
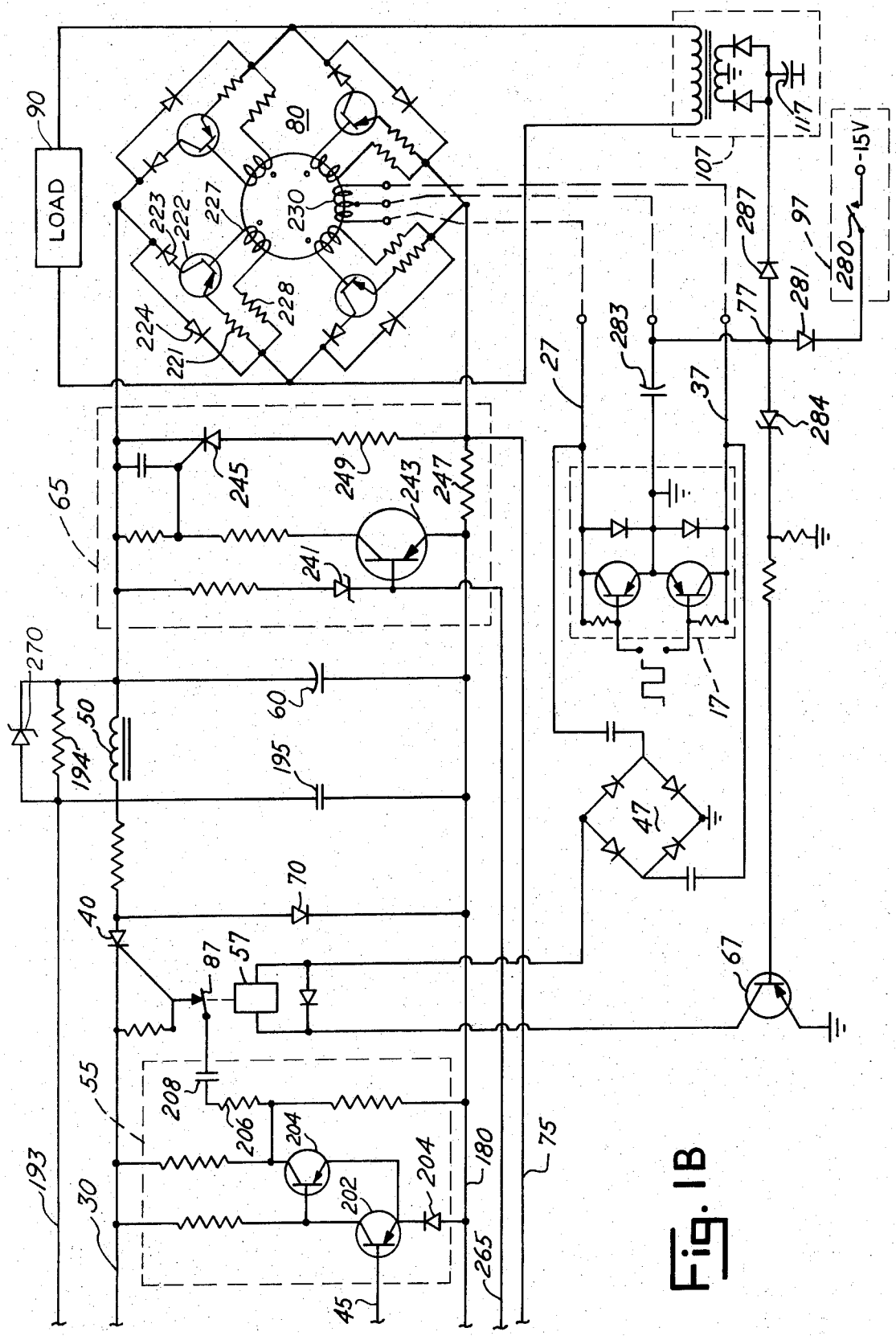

Power is obtained from an A.C. line source 10, converted to pulsating D.C. by a bridge rectifier 20, the negative terminal of which is connected via the negative main bus 30 to the cathode of an SCR (silicon controlled-rectifier) 40 seen in FIG. 1B. The SCR 40 is interconnected with a smoothing inductor 50, a filter capacitor 60, and a catching diode 70 in a switching regulator configuration. When SCR 40 switches into conduction, current flows through the inductor 50 to charge the capacitor 60. When conduction through the SCR 40 is terminated, current continues to flow (in the same direction) through the inductor 50 and the catching diode 70. Inductor 50, capacitor 60, and diode 70 accordingly cooperate to provide a D.C. voltage across capacitor 60 having relatively small A.C. "ripple."

The D.C. voltage appearing across capacitor 60 is applied across the transistor bridge 80 whose switching current output terminals are connected to a load 90.

The controlled-rectifier 40 is gated into conduction at a variable "firing angle" or phase delay after each "zero-crossing" of the A.C. line voltage waveform. The voltage from source 10, after passing through a noise suppressing filter 15, is applied to two diodes 25 which deliver a full-wave-rectified, pulsating D.C. voltage to an isolated sawtooth waveform generator 35 whose output is connected to a summing node 45 at the input of a threshold circuit 55. A further circuit which includes the level adjusting variable resistor 44 supplies an error signal to the anode 45 which fluctuates with changes in the level of the D.C. output voltage appearing across capacitor 60.

The sum of this error signal and the sawtooth waveform from the generator 35, when applied to the threshold circuit 55 times the generation of firing pulses applied to the gate of the SCR 40. Thus, these pulses have a variable time position controlled by load voltage fluctuations. Increases in the level of the D.C. output voltage across capacitor 60 retard the appearance of the firing pulses delivered to the gate of SCR 40, delaying the point in time when SCR 40 is gated into conduction, and reducing the amount of energy in each half-cycle of the A.C. line voltage which is delivered to the load circuit.

The power supply is provided with a crowbar circuit 65 (seen in FIG. 1B) which is effective to place a low-impedance across the filter capacitor 60 whenever an overvoltage or overcurrent condition is sensed. At the same time, the circuit 65 produces a momentary inhibit signal on its output conductor 75, this inhibit signal being applied to a latching circuit 85 (seen in FIG. 1A). The latching circuit 85 converts the momentary inhibit signal appearing on conductor 75 into a continuing signal appearing on output conductor 95 which is connected to the node 45 and is effective to prevent the further generation of firing pulses by the threshold circuit 55. In this way, the combination of the crowbar circuit 65, the latching circuit 85, and the operation of the threshold circuit 55 prevents the energy stored on the capacitor 60 from damaging either the bridge 80 or the load circuit 90 and also blocks the flow of further power through the SCR 40.

The power conversion bridge 80, which converts the D.C. voltage appearing across capacitor 60 into a switched polarity voltage applied to the load 90, employs transistors which are switched into full saturation. The transistors in the bridge 80 are switched in and out of conduction by an intermediate power amplifier 17 which converts a low-level squarewave input signal into a high-amplitude squarewave signal appearing across output conductors 27 and 37 which drive the base circuits of the switching transistors in the bridge 80.

To insure that D.C. power will not be applied to the bridge through SCR 40 until adequate base drive is present, the voltage appearing across conductors 27 and 37 is rectified by the bridge 47, the negative output terminal of which is connected through a relay solenoid 57 to the collector of a transistor 67. Transistor 67 is conductive when and only when an adequate negative potential is applied to its base, and this occurs when and only when a supply voltage is present on the conductor 77 to power the intermediate power amplifier 17. Thus, the solenoid 57 will not be energized until full base drive is present to operate the switching transistors in the bridge 80. Until this occurs, the relay contact 87 controlled by the solenoid 57 will remain open, insuring that the SCR 40 is not gated into conduction.

Delivery of power to the load 90 is initiated by the application of a negative potential to the conductor 77 from the switched source 97, closing relay contacts 87 as soon as full base-current drive to the bridge 80 is insured. To terminate the application of power to the load 90, the application of the −15.0 volt supply voltage from the switched source 97 is terminated. Because, at this time, substantial energy still exists in capacitor 60 and inductor 50, however, the intermediate power amplifier 17 which drives the bridge 80 continues to operate by virtue of a supplementary D.C. supply voltage source 107 connected across the output of the bridge 80. The voltage level delivered by the rectifier 107 is not, however, adequate to maintain transistor 67 in conduction; accordingly, the termination of power from the switched source 97 also interrupts the flow of firing pulses through the relay contacts 87 to the SCR 40. As will be discussed subsequently in more detail, the voltage across capacitor 60, and the bridge drive appearing across conductors 27 and 37, both decrease in a gradual, exponential fashion following turn OFF, at all times insuring that the switching transistors in the bridge 80 are operated in their saturated mode.

Both the latching circuit 85 and the sawtooth generator 35 are supplied with a stable, regulated operating voltage produced by a low voltage supply 120 which comprises a current limiting resistor 121, a peak detecting diode 122, a capacitor 123, and the series combination of a resistor 124 and a Zener diode 125. The voltage on the supply bus 131 is held at a potential equal to the reverse drop across the Zener diode 125.

The sawtooth generator 35 produces a waveform synchronized with the A.C. line voltage from the source 10. The series combination of a resistor 141 and diodes 143 to 145 cease conducting only when the line voltage from source 10 closely approaches zero volts. The voltage thus created across the diode 144 holds transistor 146 in conduction, except for momentary interruptions in its conductivity, at which times a negative-going pulse is applied to the control electrode of a programmable, unijunction transistor 150. The unijunction transistor 150 then discharges timing capacitor 154. When transistor 146 is immediately thereafter again switched back into conduction and after capacitor 154 is discharged, unijunction transistor 150 is again turned OFF, and the current through resistor 156 charges capacitor 154 at a substantially constant rate. The linearly increasing voltage across capacitor 154 is amplified by an emitter-follower including transistor 160.

At the time of the next line voltage zero-crossing, capacitor 154 is again discharged, beginning the cycle again. In consequence, the generator 135 produces a sawtooth waveform in which each "tooth" occupies one-half cycle of the A.C. line voltage.

The voltage appearing at the emitter of transistor 160 is applied across the series combination of a capacitor 161 and two back-to-back Zener diodes 163 and 164, producing (at the junction of diode 163 and capacitor 161) a sawtooth waveshape having both peak potentials precisely clamped (in relation to the voltage on the positive main supply bus 180). Resistor 181 couples this sawtooth waveform to the node 45 which also receives a sample of the voltage across capacitor 60 via Zener diode 191, variable resistor 44 (both shown in FIG. 1A), conductor 193 and resistor 194. This circuit supplies a signal equal to the output D.C. voltage appearing across the capacitor 60, reduced in magnitude by the voltage divider formed by the combination of resistors 194 and 196 and potentiometer 44, and reduced still further by the constant drop across the Zener diode 191.

The summing network (which includes resistor 201 which is connected between the summing node 45 and the positive bus 180) thus additively combines the fixed magnitude sawtooth waveshape from the generator 35 with an error signal derived from the voltage across the filter capacitor 60 to produce a composite, variable amplitude timing signal applied to the base of transistor 202 in the threshold circuit 55. (It may be noted that means are provided for applying an additional signal to the summing node 45 via resistor 205 (seen in FIG. 1A). In normal operation, the circuitry providing a signal through resistor 205 is inactive, and its special function will be discussed later in this specification.)

At the beginning of each half-cycle the alternating current energy, the voltage at the summing node 45 (and hence at the base of transistor 202) is at its most negative potential. As capacitor 154 charges, the voltage at node 45 becomes increasingly less negative until it equals the sum of the forward drops across diode 204 and the emitter-base junction of transistor 202, thereafter turning transistor 202 OFF and turning transistor 204 ON, causing a positive pulse to be delivered through the series combination of resistor 206, capacitor 208, and the relay contact 87 to the gate electrode of SCR 40.

It should be observed that the timing of the "firing angle" when transistor 202 turns OFF and transistor 204 turns ON changes as the voltage across capacitor 60 changes. In effect, load voltage fluctuations control the firing angle by shifting the threshold level (at which transistor 202 is switched) with respect to the fixed magnitude periodic timing waveshape created at the junction of capacitor 161 and diode 163. That voltage across capacitor 60 is also filtered by the combination of resistor 194 and capacitor 195 to prevent the generation of timing errors due to the presence of noise on conductor 193.

A Zener diode 270 is included in parallel with resistor 194 and is conductive during "start up" conditions to permit capacitor 195 to be rapidly charged until the difference between its voltage and the voltage across capacitor 60 equals the reverse drop across diode 270. Thereafter the capacitor 195 charges at the slower rate dictated by resistor 194.

The accurately regulated D.C. voltage which appears across capacitor 60 is then converted into a switched square waveform by the transistor bridge 80. Since the four arms of the transistor bridge 80 each comprise an essentially identical protected transistor switching arrangement, only one need be described in detail. A resistor 221 is connected in series with the emitter of a germanium PNP transistor 222, and a silicon dioded 223 is connected in series with its collector. A second silicon diode 225 is connected in parallel with the series combination of resistor 221, transistor 222 and diode 223. Switching signals are supplied to base of transistor 222 from the intermediate power amplifier 17 via conductors 27 and 37, the primary winding 230, and the secondary winding 227 which is serially connected with a current-limiting resistor 228.

The diode 224 is employed to prevent reverse current flow through transistor 222. Although it might first appear that diode 224 would effectively accomplish this purpose by itself, such is not the case because the reverse drop across germanium transistor 222 is less than the forward drop across silicon diode 224. Thus, the addition of diode 224 is effective to reduce the total amount of heat dissipated in the switching transistor 222, particularly when the load 90 is inductive.

The crowbar circuit 65 and the latching circuit 85 respond to both overvoltage and overcurrent conditions to protect both the power supply and the load.

Any voltage across capacitor 60 which exceeds a predetermined value causes Zener diode 241 to conduct, turning transistor 243 ON, and gating SCR 245 into conduction. Capacitor 60 then rapidly discharges through the low-impedance path comprising SCR 245, current sensing resistor 247, and current-limiting resistor 249.

The discharge of capacitor 60 through sensing resistor 247 causes the voltage on conductor 75 to go sharply negative with respect to the voltage on conductor 180, and this "overcurrent" condition operates latching circuit 85. In the latching circuit 85, the series combination of Zener diode 250 and resistor 251 is connected in parallel with diode 252 between conductor 75 and the base of a transistor 253. Overcurrents of sufficient magnitude cause Zener diode 250 to conduct in a reverse direction, turning transistor 253 ON, which in turn switches transistor 257 into conduction, firing SCR 260.

To prevent SCR 260 from being fired by undesired transients which do not represent an overload or overcurrent condition, the capacitor 255 and resistor 251 form a circuit for integrating those negative-going transients on conductor 75 which are of sufficient amplitude to cause the Zener diode 250 to conduct. The integrating action of this current prevents short duration transients from appearing on the base of transistor 253 in sufficient magnitude to cause conduction. Where the undesired transients are repetitive and of sufficient magnitude to cause the Zener diode 250 to conduct, a charge would normally tend to build up or accumulate on capacitor 255 causing undesired conduction of transistor 253 and the firing of SCR 260; however, since each negative-going transient on conductor 75 is usually accompanied by a positive-going transient, the diode 252 prevents such a charge from accumulating on capacitor 255 by providing a discharge path (through resistor 247) during the positive-going portion of each transient. The input circuitry connected to the base of transistor 253 thus prevents false firing of the SCR 260 due to transient disturbances but does respond to a valid overload condition (represented by negative voltage on conductor 75 of a predetermined magnitude and duration).

The firing of SCR 260 applies a negative potential to summing node 45 via Zener diode 262, diode 263 and resistor 205. This negative potential holds transistor 202 ON and transistor 204 OFF, thus suppressing the flow of further firing pulses to SCR 40 and preventing further energy flow from the line source 10 to inductor 50 and capacitor 60.

The presence of an overcurrent condition also terminates the flow of firing pulses to SCR 40 and fires the crowbar SCR 245. As current increases, the drop across sensing resistor 247 eventually reaches a level adequate to cause current flow through Zener diode 250, turning ON transistors 253 and 257 and firing SCR 260. As explained earlier, the resultant application of a negative potential to summing node 45 inhibits the production of further firing pulses. In addition, the negative potential at the anode of SCR 260 is applied via conductor 265 to the base of transistor 243, turning it ON, and firing the crowbar SCR 245. Thus the protection network comprising crowbar circuit 65 and latching circuit 85 operates to fire SCR 245 in either overcurrent or overvoltage conditions.

As previously explained, during turn-ON, relay contacts 87, controlled by solenoid 57, prevent the application of firing pulses to SCR 40 until full base drive is applied to the base of the transistors 222 in the switching bridge 80. A further arrangement is employed to insure full base drive during turn-OFF.

The intermediate amplifier 17 may receive operating power from a variety of different sources during "run down" after power flow from the switched source 97 is terminated. When the switch 280 in source 97 is opened, diode 281 no longer conducts and, as capacitor 283 discharges, the voltage level at point 77 drops from its original level at −15.0 volts, passes about −13.0 volts at which time Zener diode 284 ceases conduction (turning OFF transistor 67 and opening contacts 87), and finally drops to a sufficiently low magnitude that diode 287 conducts. Thereafter, with low-impedance loads, capacitor 117 in the supply 107 possesses sufficient charge to provide base drive to the bridge 80 until capacitor 60 discharges. For higher impedance loads, however, capacitor 60 will discharge less rapidly. For this reason, the input to auxiliary supply 107 is connected across the A.C. output of the bridge 80 which supplies its own base drive, which stays at a sufficiently high level (although decreasing exponentially) to switch the transistors 222 into saturation as the charge on capacitor 60 disappears.

It is to be understood that the embodiment of the invention which has been described is merely illustrative of one application of the principles of the invention. Numerous modifications may be made by those skilled in the art without departing from the true spirit and scope of the invention.

What is claimed is:

1. A power supply of the class comprising, in combination, a source of alternating current energy, a load circuit, controlled-rectifier switching means having a control input and interconnecting said source and said load circuit, said switching means being effective to couple said source to said load circuit during predetermined portions only of successive half-cycles of said alternating current energy, and a pulse signal source connected to said control input for providing pulse signals to said control input for initiating conduction of said switching means, wherein the improvement comprises, in combination, means included in said pulse signal source for generating a continuing periodic waveform increasing with time to a fixed magnitude and synchronized with said alternating current energy, means providing a control voltage which varies with the magnitude of the energy delivered to said load circuit, a threshold device having an input and an output for producing only one of said pulse signals during each successive half cycles of said alternating current whenever the signal applied to its input exceeds a predetermined magnitude, summing mode for additively applying said periodic waveform and said control voltage to the input of said threshold device, whereby variations in the amplitude of said control voltage varies the time position of said pulse signals relative to said alternating current, and means for generating an inhibiting signal whenever the magnitude of energy delivered to said load circuit exceeds a predetermined value, and means responsive to said inhibiting signal for providing a signal to said summing mode which prevents a signal presented to the input of said threshold device from exceeding said predetermined magnitude needed to produce one of said pulse signals.

2. A power supply as set forth in claim 1 wherein said means for generating said periodic waveform comprises, in combination, a timing capacitor, means for charging said capacitor at a rate substantially independent of variations in the amount of energy being delivered to said load, and means responsive to the zero-crossings of the waveform of said alternating current energy for repeatedly discharging said capacitor, thereby forming said periodic waveform.

3. A power supply as set forth in claim 2 including diode clamping means for fixing the peak-to-peak amplitude of said periodic waveform.

4. A power supply of the class comprising, in combination, a source of alternating current energy, a rectifier for converting said alternating current energy into pulsating direct current energy, a controlled-rectifier having a control electrode and a switched circuit path, said switched circuit path being serially connected with an inductor and a filter capacitor across the output of said rectifier, a catching diode connected in parallel with said inductor and said filter capacitor and poled to permit continued current flow through said inductor when said controlled-rectifier ceases conduction, and a load circuit connected in parallel with said filter capacitor, wherein the improvement comprises, in combination, a timing capacitor, means for charging said timing capacitor at substantially constant rate, means coupled to said source and responsive to the zero-crossings of the waveform of said alternating current for periodically discharging said timing capacitor to produce a period timing waveform of fixed amplitude and waveshape which is synchronized with said alternating current energy, a source of a control signal, a threshold circuit for producing a firing signal when said timing waveform reaches a predetermined threshold level, said circuit including means for shifting said threshold level relative to said timing waveform in response to variations in the amplitude of said control signal, and means for applying said firing signal to the control electrode of said controlled-rectifier to initiate conduction therethrough, said load circuit comprising, a transistor bridge circuit having a switching signal input, a direct current power input and an alternating current power output, said direct current power input being connected to said filter capacitor and said alternating current power output being connected to utilization load circuit, a switching signal generator connected to the switching signal input of said bridge, a first source for operating potential connected to said generator, and a second source connected to the alternating current power output of said bridge for providing auxiliary operating power to said switching signal generator when the supply of operating potential from first source is terminated.

5. A power supply as set forth in claim 4 wherein said transistor bridge circuit comprises four like bridge arms, each including a protected transistor switching element, said switching element comprising, in combination, a first silicon diode connected in parallel with the series combination of the collector-emitter path of a germanium transistor and a second silicon diode, said second diode being poled to block reverse currents through said transistor while said first diode is poled to conduct said reverse currents around said series combination.

6. A power supply as set forth in claim 4 further including means for preventing the application of said firing signal to said control electrode unless said first source is supplying an operating potential to said generator and the signal applied to the switching signal input to said bridge exceeds a predetermined value.

7. A power supply of the class comprising, in combination, a source of alternating current energy, means including at least one controlled-rectifier for periodically conducting energy from said source to a load circuit, and means for generating periodic firing signals for initiating conduction through said controlled-rectifier, said generating means including means responsive to a control signal for varying the timing of said firing signals relative to the waveform of said alternating current to thereby vary the amount of energy delivered to said load, wherein the improvement comprises, in combination, means synchronized with said alternating current for generating a periodic timing signal having a fixed amplitude and waveform, both of which are substantially independent of variations in the magnitude of either said alternating current energy or the energy delivered to said load, a threshold device for generating said firing signals where the instantaneous magnitude of said periodic timing signal equals a threshold level, said device including means for shifting said threshold level relative to said waveform in response to said control signal to vary the timing of said firing signal; and coupling means for varying the magnitude of said control signal in response to variations in at least one parameter of the energy delivered to said load circuit, said coupling means including filtering means for minimizing the effect of momentary variations in said parameter on said control signal, said filtering means comprising the parallel combination of a resistor and a Zener diode connected between said load circuit and a filter capacitor, said Zener diode providing an additional current path for charging said filter capacitor when voltage first appears on said load circuit.

8. In a power supply system, apparatus for detecting the presence of an overcurrent condition in a protected circuit which comprises, in combination, a current sensing resistor connected in series with said circuit, the series combination of a Zener diode, a second resistor and a capacitor connected in parallel with said current sensing resistor, a conventional diode connected in parallel with the series combination of said second resistor on said Zener diode, and a threshold device for detecting the presence of overcurrent conditions connected to respond to voltages across said capacitor in excess of a predetermined value.

* * * * *

UNITED STATES PATENT OFFICE
CERTIFICATE OF CORRECTION

Patent No. 3,831,077          dated   August 20, 1974

Inventor(s)   William E. Richeson

It is certified that error appears in the above identified patent and that said Letters Patent are hereby corrected as shown below:

Column 2, line 41, change "anode" to --node--.

Column 5, line 23, change "dioded" to --diode--.

Column 6, line 2, change "current" to --circuit--.

Column 8, line 39, change "for" to --of--.

Signed and sealed this 29th day of October 1974.

(SEAL)
Attest:

McCOY M. GIBSON JR.
Attesting Officer

C. MARSHALL DANN
Commissioner of Patents